United States Patent [19]
Teng et al.

[11] 3,819,390
[45] June 25, 1974

[54] LIPOPHILIC CELLULOSE SPONGES

[75] Inventors: James Teng; Marcella C. Stubits, both of St. Louis, Mo.

[73] Assignee: Anheuser-Busch Incorporated, St. Louis, Mo.

[22] Filed: Jan. 24, 1972

[21] Appl. No.: 220,393

[52] U.S. Cl.................................. 106/122, 260/224
[51] Int. Cl........................... B29d 3/10, C08b 3/10
[58] Field of Search.................... 106/122, 168, 169; 260/214, 218, 224, 229; 117/98

[56] References Cited
UNITED STATES PATENTS

| | | | |
|---|---|---|---|
| 2,085,047 | 6/1937 | Schneider | 106/122 |
| 3,329,664 | 7/1967 | Tsuda | 260/224 |
| 3,677,982 | 7/1972 | Marx | 117/98 |

OTHER PUBLICATIONS

High Polymers, Vol. 5, "Cellulose", Second Edition, Part II, 1954, pages 790–797.

*Primary Examiner*—Allan Lieberman
*Attorney, Agent, or Firm*—Gravely, Lieder & Woodruff

[57] ABSTRACT

This disclosure concerns a cellulose fatty acid ester sponge which picks up oil and non-polar solvents. The sponge has a bulk density of $0.02 g/cm^3$ to $0.06 g/cm^3$ and the degree of substitution of the cellulose is 1.2 to 2.9. The sponge is made by reacting a cellulose sponge with fatty acid derivatives, specifically lauroyl chloride, under controlled conditions. The esterified sponge has a bulk density of 0.5 to $3 g/cm^3$.

2 Claims, No Drawings

LIPOPHILIC CELLULOSE SPONGES

REFERENCE TO OTHER APPLICATIONS

This application contains subject matter in common with applications filed of even date herewith as follows:

Application of Stubits entitled Dry cleaning Method, Ser. No. 220,451; application of Stubits entitled Method Of Absorbing Fats And Oils, Ser. No. 220,392; application of Teng et al. entitled Method of Removing Oil Spills, Ser. No. 220,385; and previous filed pending applications of Teng et al., Ser. No. 845,067, filed July 25, 1969 (now abandoned); Ser. No. 154,219, filed June 17, 1971 (now U.S. Pat. No. 3730693, granted May 1, 1973); Ser. No. 106,882, filed Jan. 15, 1971 (now U.S. Pat. No. 3,732,205, granted May 8, 1973); and Ser. No. 44,640, filed June 8, 1970 (now abandoned).

BACKGROUND OF THE INVENTION

Synthetic cellulose sponges are a staple item of commerce readily available in stores which sell housewares. These items have an open cellular structure which is characterized by numerous capillaries and interstitial voids in the sponge structure.

Sponges are characterized by their ability to pick up and retain liquid which is released when the sponge is squeezed or otherwise compressed. We have found that when sponges are reacted with a fatty acid derivative to produce a cellulose fatty acid ester, the resulting sponge has lipophilic properties. That is, it has a strong affinity for fats and other liquids.

Thus, we have found that a lipophilic sponge of this invention has the ability to absorb a large amount of oil by means of two mechanisms. The lipophilic sponge substrate absorbs oil through solvation and swelling of the substrate itself. In addition to that action, a large amount of the oil is captured in the capillaries and the interstitial voids within the sponge structure. Such a lipophilic sponge can pick up oils and other non-polar solvents.

The sponge may find uses wherever the entrapment of non-polar solvents is desirable.

For example, the sponge may be saturated with solvent and used as a dry cleaner for rugs, furniture etc. The lipophilic sponge may be used to remove fat from the surface of cooking vessels or it may be used to remove oil spills from beaches or the surfaces of large bodies of water.

SUMMARY OF THE INVENTION

The invention comprises a fixed form cellulose sponge reacted with a fatty acid derivative to produce a lipophilic cellulose sponge which has attraction for non-polar solvents and oils.

DETAILED DESCRIPTION

To prepare the lipophilic cellulose esters, two common household cellulose sponges, (1) a 3 × 5 × 1 inch block of cellulose sponge, and (2) a 5 × 5 × ⅛ inch sponge cloth, were cut into 1 × 1 × ⅛ inch sections (having a total weight of 5.0 g) and esterified with 58 g. of lauroyl chloride, using 30 g. pyridine as a catalyst in 155 g. dioxane solvent at 100°C. Samples of sponges were taken at 30 minute intervals over a period of 2 hours, washed with alcohol and dried.

These sponge samples were hydrophobic as well as lipophilic. Each section absorbed about ten times its weight in melted fat or oil. The amount of fat absorbed was determined by the degree of substitution and porosity of the esterified sponge. The fat can be easily pressed from the sponge, and thus the sponge can be reused numerous times.

Following is a table setting forth the amount of fat absorbed as a function of the degree of substitution:

TABLE NO. I

| D.S. | Fat Absorbed/gram sponge |
|---|---|
| 1.2 | 9 |
| 1.5 | 10 |
| 1.9 | 12 |
| 2.4 | 8 |
| 2.8 | 5 |

The degree of substitution (D.S.) is based on a theoretical maximum of 3 and is a measure of the substitution with lipophilic groups of the theoretically available hydroxyl functions per monosaccharide unit in the cellulose.

The fatty acid derivative can have a chain length of between about C-8 and C-18 and can be saturated or unsaturated.

In the esterification reaction, about 1,000 parts to about 1,500 parts by weight fatty acid derivative is reacted with each 100 parts by weight cellulose. About 500 to about 700 parts by weight pyridine and about 3,000 to about 4,000 parts by weight dioxane are used for each 100 parts by weight of cellulose. The temperature is between about 85°c. and about 100°C. If higher temperatures are used the rate of reaction is increased, but severe degradation may also occur. The reaction is too slow and inefficient at lower temperatures.

The cellulose sponge to be esterified has a bulk density between 0.02 g/cm$^3$ and 0.06 g/cm$^3$.

The cellulose can be reacted in pieces from 3 to 10 mm in thickness. If thicker pieces are used the esterification is not complete; thinner pieces result in disintegration. If desired, the cellulose laurate sponge can be reduced in size after esterification but usually the pieces are esterified at the size of ultimate usage.

After esterification the cellulose sponge has a bulk density of about 0.05 g/cm$^3$ to about 0.3 g/cm$^3$, and a degree of substitution of about 1.2 to 2.9.

Other suitable cellulose-fatty acid esters can be made from Myristic, stearic and oleic acids.

The amount of fat absorbed is from about two parts to about 12 parts by weight, per part of the esterified sponge. The amount of cleaning fluid carried is about two parts to about 15 parts by weight per part of the esterified sponge. Above a certain level, the higher the degree of substitution, the less fat and solvent the sponge will hold. The temperature of cleaning is about 70° to 80°F. The solvent-filled sponge is applied for about 5 to about 10 minutes.

The suitable solvents and cleaners include aliphatic, aromatic, heterocyclic, and halogenated hydrocarbons.

Following are specific examples of this invention:

EXAMPLE NO. I

Five grams of melted beef fat of melting point 50°C. is stirred into 200 ml. boiling water. A 0.5 gram section of esterified sponge cloth of size 2 cm × 2 cm × 5 mm having a degree of substitution of 1.5 is dropped into the mixture. The sponge cloth had been esterified with lauroyl chloride as hereinbefore set forth. The sponge cloth has a bulk density of 0.12 g/cm$^3$. The sponge quickly becomes saturated with fat, and floats on the surface of the fat-water mixture. The sponge is removed, squeezed to remove the liquid fat, and returned to the fat-water mixture, where it absorbs the remaining fat. This procedure is identical for pork fat, chicken fat, and Crisco (vegetable oil). Similar results are obtained with sections of esterified block sponge. All 5 grams of beef fat were removed from the mixture. In the first pass 4.0 grams of fat were removed.

EXAMPLE NO. II

Five grams of Crisco (vegetable oil) is stirred into 200 ml. boiling water. 0.5 grams of cellulose laurate sponge particles having a degree of substitution of 2.5 and a size of 8 mesh (U.S. Standard Series) is added to the mixture from a tared vial. The sponge particles quickly become saturated with fat, stick together, and are easily removed as a solid cohesive mass. In all, approximately one-half gram of sponge is used to absorb a total of five grams of fat. This procedure was identical for beef, pork and chicken fat. Similar results were obtained with sections of esterified sponge cloth. On the first application about 3 to about 4 grams of fat will be absorbed by the cellulose. Repeat treatment and continue until sufficient oil has been removed.

EXAMPLE NO. III

This example shows the use of cellulose laurate sponge as a rug cleaner.
A. Preparation of carpet for test
 1. Carbon soot and beef fat are mixed and worked into the pile of a wool carpet in spots of 1 inch diameter. Each spot has about 0.1 grams soot and about 1 gram beef fat.
 2. Crude oil is dropped onto the carpet to produce spots of approximately one-half inch diameter. Each spot has about 0.5 grams oil.
The carpet is placed on a non-absorbent surface for stain removal.

B. Stain Removal
 1. Control
  The spot is rubbed with a cotton cloth saturated with perchloroethylene. The stain had a tendency to smear, and spread into a larger circle. Repeated scrubbing failed to remove either the beef fat or crude oil stain completely. The addition of more solvent flushed the stain deeper into the carpet and through to the jute back. About 250 ml. fluid is applied to each sq. ft. of surface to be cleaned. The temperature is about 75°F.
 2. Cellulose laurate powder sponge of 10 mesh (U.S. Standard), and having a D.S. of 2.0 is saturated with perchloroethylene. 10 grams of perchloroethylene is added to each gram of sponge.

3. The solvent saturated cellulose laurate sponge is pressed onto the stained carpet pile. The grease dissolves in the solvent, and is quickly absorbed by the cellulose laurate sponge. The stain showed no tendency to spread. After 5 minutes, the cellulose laurate sponge is removed from the carpet. There is no trace of stain from either the carbon-fat mixture, or the crude oil. The dissolved grease had been sucked up from the surface of the carpet, rather than flushed through to the back. The fibers appeared restored to their original condition; there was no trace of matting or stickiness from the cellulose laurate sponge. About 5 grams of cleaner was added to each sq. inch of area to be cleaned. The temperature is about 75°F.

What is claimed is:
1. A lipophilic cellulose fatty acid ester sponge characterized by its ability to pick up and retain liquid which is released when the sponge is squeezed or otherwise compressed having a bulk density of about 0.05 g/cm$^3$ to about 0.03 g/cm$^3$, wherein the cellulose fatty acid ester has a degree of substitution of about 1.2 to about 2.9 and a chain length of about eight to about 18 carbon atoms
2. The sponge of claim 1 wherein the cellulose fatty acid ester is cellulose laurate.

\* \* \* \* \*